United States Patent [19]

Tanaka et al.

[11] Patent Number: 5,910,567
[45] Date of Patent: Jun. 8, 1999

[54] PROCESS FOR PREPARING DEPROTEINIZED NATURAL RUBBER LATEX MOLDING AND DEPROTEINIZING AGENT FOR NATURAL RUBBER LATEX

[75] Inventors: Yasuyuki Tanaka, Tokyo; Shinichi Nakade, Hyogo; Atsuko Ochi, Hyogo; Toshiaki Sakaki, Hyogo; Masaharu Hayashi, Wakayama; Kazuhiro Sekiguchi, Tokyo; Akihito Kuga, Tokyo; Eiji Kanamaru, Tokyo, all of Japan

[73] Assignees: Fuji Latex Co., Ltd., Tokyo; Sumitomo Rubber Industries, Ltd., Hyogo; Kao Corporation, Tokyo, all of Japan

[21] Appl. No.: 08/913,863

[22] PCT Filed: Mar. 14, 1996

[86] PCT No.: PCT/JP96/00640

§ 371 Date: Dec. 19, 1997

§ 102(e) Date: Dec. 19, 1997

[87] PCT Pub. No.: WO96/28500

PCT Pub. Date: Sep. 19, 1996

[30] Foreign Application Priority Data

| Mar. 14, 1995 | [JP] | Japan | 7-80883 |
| Mar. 14, 1995 | [JP] | Japan | 7-80884 |
| Apr. 10, 1995 | [JP] | Japan | 7-84215 |
| Apr. 10, 1995 | [JP] | Japan | 7-84216 |

[51] Int. Cl.$^6$ .............................. A61K 38/46; C08J 3/26; C08L 7/02; C08C 1/04
[52] U.S. Cl. .................. 528/491; 264/331.13; 424/94.6; 524/575.5; 524/925; 524/926; 528/494; 528/495; 528/496; 528/499; 528/932; 528/934; 528/935
[58] Field of Search ........................ 424/94.6; 524/575.5, 524/925, 926; 528/491, 494, 495, 496, 499, 932, 934, 935; 264/331.13

[56] References Cited

U.S. PATENT DOCUMENTS

| 4,456,544 | 6/1984  | Lupova et al.      | 252/109   |
| 5,336,424 | 8/1994  | Van Vlahakis et al.| 252/106   |
| 5,569,740 | 10/1996 | Tanaka et al.      | 528/488   |
| 5,580,942 | 12/1996 | Cornish            | 528/499   |
| 5,585,459 | 12/1996 | Tanaka et al.      | 528/491   |
| 5,610,212 | 3/1997  | Tanaka et al.      | 524/575.5 |
| 5,622,998 | 4/1997  | Tanaka et al.      | 524/575.5 |
| 5,717,050 | 2/1998  | Cornish            | 524/499   |
| 5,777,004 | 7/1998  | Trautman           | 528/491   |

*Primary Examiner*—Peter A. Szekely
*Attorney, Agent, or Firm*—Steinberg & Raskin, P.C.

[57] ABSTRACT

A method for producing a formed product of deproteinized natural rubber latex capable of reducing a content of an allergen in a natural rubber latex material to a level sufficient to keep the latex from being harmful to the human body without decreasing yields of the product and deteriorating formability of the latex. In the method, cleaning removal of a non-rubber content is carried out after each of protein decomposition, prevulcanization and forming. An aqueous alkali solution, ammonia, water containing free chlorine in an amount of 0.005 to 0.02% by weight or alcohol-water mixed liquid containing alcohol in an amount of 5 to 80% by weight is used as cleaning liquid for the cleaning removal. The method is suitably applied to production of a natural rubber product such as a rubber glove, a condom, a catheter, a foam rubber material and the like.

21 Claims, 4 Drawing Sheets

Fig. 1

| STEP | STATE OF LATEX | MATERIAL |
|---|---|---|
| CHARGE | | LATEX |
| | UNVULCANIZED NATURAL RUBBER LATEX | |
| PROTEIN DECOMPOSITION | | SURFACTANT, PROTEASE |
| | UNVULCANIZED NATURAL RUBBER LATEX | |
| PREVULCANIZATION | | VULCANIZING AGENT, VULCANIZATION ASSISTANT, VULCANIZATION ACCELERATOR, ANTIOXIDANT |
| | PREVULCANIZED NATURAL RUBBER LATEX | |
| FORMING | | |
| | PRIMARY VULCANIZED NATURAL RUBBER | |
| EXTRACTION CLEANING | | EXTRACTING CLEANING AGENT(1) |
| | LOW-PROTEIN PRIMARY VULCANIZED NATURAL RUBBER | |
| STRIPPING | | DETACKIFIER |
| | LOW-PROTEIN PRIMARY VULCANIZED NATURAL RUBBER | |
| EXTRACTION CLEANING | | EXTRACTING CLEANING AGENT(2) |
| | DEPROTEINIZED PRIMARY VULCANIZED NATURAL RUBBER | |
| POSTVULCANIZATION | | |
| | DEPROTEINIZED NATURAL RUBBER | |

Fig. 2

| STEP | STATE OF LATEX | MATERIAL |
|---|---|---|
| CHARGE | | LATEX |
| | UNVULCANIZED NATURAL RUBBER LATEX | |
| PROTEIN DECOMPOSITION | | SURFACTANT, PROTEASE |
| | UNVULCANIZED NATURAL RUBBER LATEX | |
| CENTRIFUGING | | DILUTING WATER |
| | LOW-PROTEIN UNVULCANIZED NATURAL RUBBER LATEX | |
| CHARGE | | |
| | LOW-PROTEIN UNVULCANIZED NATURAL RUBBER LATEX | |
| PREVULCANIZATION | | VULCANIZING AGENT, VULCANIZATION ASSISTANT, VULCANIZATION ACCELERATOR, ANTIOXIDANT |
| | LOW-PROTEIN PREVULCANIZED NATURAL RUBBER LATEX | |
| FORMING | | DILUTING WATER |
| | LOW-PROTEIN PRIMARY VULCANIZED NATURAL RUBBER | |
| EXTRACTION CLEANING | | EXTRACTING CLEANING AGENT(1) |
| | LOW-PROTEIN PRIMARY VULCANIZED NATURAL RUBBER | |
| STRIPPING | | DETACKIFIER |
| | LOW-PROTEIN PRIMARY VULCANIZED NATURAL RUBBER | |
| EXTRACTION CLEANING | | EXTRACTING CLEANING AGENT(2) |
| | DEPROTEINIZED PRIMARY VULCANIZED NATURAL RUBBER | |
| POSTVULCANIZATION | | |
| | DEPROTEINIZED NATURAL RUBBER | |

Fig. 3

| STEP | STATE OF LATEX | MATERIAL |
|---|---|---|
| CHARGE | | LATEX |
| | UNVULCANIZED NATURAL RUBBER LATEX | |
| PROTEIN DECOMPOSITION | | SURFACTANT, PROTEASE |
| | UNVULCANIZED NATURAL RUBBER LATEX | |
| PREVULCANIZATION | | VULCANIZING AGENT, VULCANIZATION ASSISTANT, VULCANIZATION ACCELERATOR, ANTIOXIDANT |
| | PREVULCANIZED NATURAL RUBBER LATEX | |
| CENTRIFUGING | | DILUTING WATER |
| | LOW-PROTEIN PREVULCANIZATION NATURAL RUBBER LATEX | |
| FORMING | | DILUTING WATER |
| | LOW-PROTEIN PRIMARY VULCANIZED NATURAL RUBBER | |
| EXTRACTION CLEANING | | EXTRACTING CLEANING AGENT(1) |
| | LOW-PROTEIN PRIMARY VULCANIZED NATURAL RUBBER | |
| STRIPPING | | DETACKIFIER |
| | LOW-PROTEIN PRIMARY VULCANIZED NATURAL RUBBER | |
| EXTRACTION CLEANING | | EXTRACTING CLEANING AGENT(2) |
| | DEPROTEINIZED PRIMARY VULCANIZED NATURAL RUBBER | |
| POSTVULCANIZATION | | |
| | DEPROTEINIZED NATURAL RUBBER | |

PROCESS FOR PREPARING DEPROTEINIZED NATURAL RUBBER LATEX MOLDING AND DEPROTEINIZING AGENT FOR NATURAL RUBBER LATEX

BACKGROUND OF THE INVENTION

This invention relates to a deproteinizing agent for natural rubber latex which is used for producing a rubber product derived from natural rubber latex and decreased in content of allergy inducer to a level sufficient to keep it from being harmful to the human body, such as a surgical glove, a catheter, a condom, a foam rubber product or the like, as well as a method for producing a formed product of deproteinized natural rubber latex suitable for production of the above-described rubber product derived from natural rubber latex.

Natural rubber latex is commonly used as a material for a foam product such as a foam rubber product, a dipped product such as a glove, a condom or a catheter, a pressure-sensitive adhesive, an adhesive, and the like on an industrial scale. The natural rubber latex is obtained in the form of sap of a gum tree such as *hevea brasiliensis* or the like cultivated in a plantation and contains a rubber content in an amount of about 30%, as well as a non-rubber content including protein, fatty acids, polysaccharides, minerals and the like. The non-rubber content is contained in an amount of several percent. The natural rubber latex is called field latex. In order to permit the field latex to be used for an industrial material, it is required to be purified. For this purpose, the field latex is purified while being condensed to a degree sufficient to have a rubber content to be as high as about 60% and ammonia is added to the thus condensed and purified latex in an mount of 0.2 to 0.7% based on the latex in order to prevent putrefaction or rotting of the latex.

Such condensation and purification of the field latex may be carried out, for example, by creaming or centrifuging. In general, centrifuging is predominantly used to this end because it accomplishes purification of the field latex with increased efficiency. The centrifugal procedure permits purified natural rubber latex which is decreased in protein content to a level as low as about 2% to 3% by weight to be provided. About half of protein left in the purified natural rubber latex is water-extractable, to thereby act as a protective colloid in the latex, resulting in contributing to stabilization of the latex. The remaining protein is chemically bonded to rubber particles, to thereby be rendered hydrophobic. The hydrophobic protein bonded to the rubber particles permits the rubber particles to be stabilized in water and is readily oxidized to prevent oxidation and deterioration of the rubber.

In recent years, it is reported that use of medical supplies made of natural rubber such as a surgical glove and the like causes immediate hypersensitivity, to thereby give rise to a problem. The immediate hypersensitivity includes Type IV allergy represented by urticaria and Type I allergy causing dyspnea or anaphylaxis. It is confirmed that Type IV allergy is induced by a vulcanization accelerator blended in unvulcanized natural rubber and Type I allergy is induced by protein contained in the rubber.

Such allergies are caused when a patient having an antibody produced in the body due to contact with an allergy inducing material (hereinafter referred to as "allergen") such as protein or the like contained in natural rubber contacts with the allergen again. Thus, there would be likelihood that many latent patients are found in people commonly using a natural rubber product containing the allergen. For example, it is reported that an incident rate at which the medical interest commonly using a surgical glove or an examination glove made of natural rubber takes an allergic disease is increased to a level as high as 10%. The Food and Drug Administration (FDA) appeals manufacturers of such a natural rubber product to reduce a content of protein in a natural rubber material to be used. Thus, it will be noted that generation of allergies due to use of a natural rubber product gives rise to a serious social problem.

Although it is thus indicated that natural rubber gives rise to the above-described problem, natural rubber is significantly advantageous in that it is decreased in cost, exhibits increased toughness and permits a product made of natural rubber to exhibit satisfactory workability and fittingness. Unfortunately, there has not been found any substitute for natural rubber exhibiting such excellent properties. Thus, it is highly desirable to develop natural rubber which is decreased in allergen content to a level sufficient to keep it form being harmful to the human body.

Conventionally, a decrease in content of protein, which is a major allergen, in natural rubber is carried out by cleaning natural rubber latex or a natural rubber product with hot water or dipping it in a cleaning tank for a suitable length of time. Alternatively, it is carried out by subjecting a natural rubber product to a surface treatment using chemicals such as chlorine or the like. Unfortunately, such a procedure fails to remove the allergen from natural rubber to a degree sufficient to significantly reduce generation of allergies.

Also, techniques of providing deproteinized natural rubber latex using protease and a surfactant are proposed as disclosed in Japanese Patent Application Laid-Open Publications Nos. 56902/1994 (6-56902), 56903/1994 (6-56903), 56904/1994 (6-56904), 56905/1994 (6-56905) and 56906/1994 (6-56906).

The techniques disclosed accomplish removal of protein from natural rubber to a certain degree, however, it encounters another problem due to a surfactant used for removal of protein. The surfactant exhibits an important function for stabilization of the latex and cleaning of the protein. However, when it is left in an excess amount in natural rubber during a forming step, it deteriorates film forming properties of the rubber and decreases strength of a formed product. In particular, it is known in the art that a deterioration in film forming properties of the rubber appears in straight dip forming practiced for formation of a thin film such as a condom or the like or when an anionic surfactant is used as the surfactant. Also, when the surfactant is left in a formed product of natural rubber, it per se deteriorates safety of the product.

Further, the techniques disclosed require both operation for diluting natural rubber with water and operation for concentrating it by centrifuging or the like, to thereby cause an increase in the number of steps, leading to a decrease in yields of deproteinized natural rubber latex and a deterioration in quality thereof.

SUMMARY OF THE INVENTION

The present invention has been made in view of the foregoing disadvantage of the prior art.

Accordingly, it is an object of the present invention to provide a method for producing a formed product of deproteinized natural rubber latex which is capable of reducing a content of allergen in natural rubber to a level sufficient to permit the natural rubber to be harmless to the human body while keeping yields of the product and a quality thereof from being reduced or deteriorated.

It is another object of the present invention to provide a deproteinizing agent for natural rubber latex which is capable of being suitably used for production of a formed product of deproteinized natural rubber latex which is intended or desired to be decreased in allergen content thereof to a degree sufficient to keep the product from being harmful to the human body.

In accordance with the present invention, a method for producing a formed product of deproteinized natural rubber latex is provided. In a first aspect of the present invention, the method includes a protein decomposition step of adding protease, a surfactant and water to natural rubber latex to decompose protein contained in the natural rubber latex, a prevulcanization step of subjecting the natural rubber to prevulcanization, a forming step of subjecting the natural rubber to forming, and a cleaning removal step of removing a non-rubber content from the natural rubber latex using extracting cleaning liquid. In a preferred embodiment of this aspect of the present invention, a postvulcanization step of subjecting the natural rubber to postvulcanization may be carried out after the cleaning removal step.

In accordance with a second aspect of the present invention, the method further includes a mechanical removal step of mechanically removing an impurity from the natural rubber, which is incorporated between the protein decomposition step and the prevulcanization step.

In accordance with a third aspect of the present invention, the method further includes a mechanical removal step of mechanically removing an impurity from the natural rubber, which is incorporated between the prevulcanization step and the forming step.

In each of the first to third aspects of the method of the present invention, the extracting cleaning liquid used in the cleaning removal step may be prepared in a specified manner.

Also, in accordance with the present invention, a deproteinizing agent for natural rubber latex is provided, which constitutes a fourth aspect of the present invention. The deproteinizing agent contains a protease and a nonionic surfactant in which LD 50 is 5000 mg/kg or more.

Now, the present invention will be described hereinafter in connection with the first to fourth aspects described above in order. The natural rubber latex employed in each of the first to fourth aspects is not limited to any specific one. Thus, any suitable natural rubber latex such as high-ammonia natural rubber latex, low-ammonia natural rubber latex or the like which is commercially available may be used in the present invention.

First, the method for producing the formed product of deproteinized natural rubber latex according to the first aspect of the present invention will be described hereinafter.

The first step or protein decomposition step is executed after natural rubber latex which is a material for the formed product is charged in any suitable reaction vessel.

The first step is to add a protease and a surfactant to natural rubber latex to decompose protein contained in the natural rubber latex. In the first step, the protein is decomposed into low-molecular weight substances by an action of the protease, so that the protein which has been bound to or adsorbed on rubber particles may be readily transferred to an aqueous phase. The rubber particles have been stably dispersed in the presence of the protein. The surfactant keeps rubber particles stable and prevents the rubber particles from a coagulation after the removal of protein.

The protease used in the first step may be the same as that used for the deproteinizing agent defined in the fourth aspect of the present invention briefly described above and detailedly described hereinafter.

The protease is used to ensure satisfactory decomposition of protein contained in the natural rubber latex. For this purpose, it may be used in an amount of 0.0005 to 5.0 parts by weight based on 100 parts by weight of the solid content of the natural rubber latex, preferably 0.001 to 1.0 parts by weight and more preferably 0.01 to 0.1 parts by weight.

The surfactant used in the present invention may be selected from the group consisting of (a) an anionic surfactant, (b) a nonionic surfactant, (c) an amphoteric surfactant and any combination of the surfactants (a) to (c).

(a) Anionic surfactant

The anionic surfactants include a carboxylic type surfactant, a sulfonic type surfactant, a sulfate type surfactant, a phosphate type surfactant and the like.

The carboxylic type surfactants may include salts of fatty acid, polyvalent carboxylates, polycarboxylates, rosinates, salts of dimer acid, salts of polymeric acid, salts of tall oil fatty acid, polyoxyalkylene alkylether acetates, polyoxyalkylene alkylamide ether acetates and the like.

The sulfonic type surfactants may include alkylbenzene sulfonates, alkylsulfonates, alkylnaphtalene sulfonates, naphthalene sulfonates, naphthalene sulfonic aldehyde condensates, arylsunfonic aldehyde condensates, alkyldiphenylether disulfonates, dialkylsulfosuccinates, α-olefin sulfonates and the like.

The sulfate type surfactants may include alkyl sulfates, polyoxyalkylene alkyl sulfates, polyoxyalkylene alkyl phenylether sulfates, mono-, di- or tri-styrylphenyl sulfonates, polyoxyalkylene mono-, di- or tri-styrylphenyl sulfates and the like.

The phosphate type surfactants may include alkyl phosphates, alkylphenol phosphates, polyoxyalkylene alkylether phosphates, polyoxyalkylene alkylphenylether phosphates, polyoxyalkylene mono-, di- or tri-styrylphenyl ether phosphates and the like.

Salts of the surfactants described above may include metal salts thereof (their salts of Na, K, Ca, Mg, Zn and the like), ammonium salts thereof, alkanol salts thereof (triethanol amine salts thereof and the like), and the like.

(b) Nonionic surfactant

The nonionic surfactants may include a polyoxyalkylene ether surfactant, a polyoxyalkylene ester surfactant, a polyhydric alcohol fatty acid ester surfactant, a sugar fatty acid ester surfactant, an alkylpolyglycoside surfactant and the like.

The polyoxyalkylene ether surfactants may include polyoxyalkylene alkylether, polyoxyalkylene alkylphenylether, polyoxyalkylenepolyol alkylether, polyoxyalkylene mono-, di- or tri-styryl phenylether and the like. The polyols described above may include polyhydric alcohols having 2 to 12 carbon atoms such as propylene glycol, glycerin, sorbitol, glucose, sucrose, pentaerythritol, sorbitan and the like.

The polyoxyalkylene ester surfactants may include polyoxyalkylene fatty acid ester, polyoxyalkylene alkylrosinate and the like.

The polyhydric fatty acid ester surfactants may include fatty acid esters of polyhydric alcohol having 2 to 12 carbon atoms, fatty acid esters of polyoxyalkylene polyhydric alcohol and the like. More specifically, the surfactants may include sorbitol fatty acid ester, sorbitan fatty acid ester, glycerin fatty acid ester, polyglycerin fatty acid ester, pentaerythritol fatty acid ester and the like, as well as polyalkyleneoxide adducts thereof such as, for example, polyoxyalkylene sorbitan fatty acid ester, polyoxyalkylene glycerin fatty acid ester and the like.

The sugar fatty acid ester surfactants may include fatty acid esters of sucrose, glucose, maltose, fructose, polysaccharide and the like, as well as polyalkyleneoxide adducts thereof.

The alkylpolyglycoside surfactants may include alkylglucoside, alkylpolyglucoside, polyoxyalkylene alkylglucoside, polyoxyalkylene alkylpolyglucoside and the like which posses glycoside in the form of glucose, maltose, fructose, sucrose and the like, as well as fatty acid esters thereof. Also, the surfactants may include polyalkyleneoxide adducts as well.

Further, in addition to the above, polyoxyalkylene alkylamine, alkylalkanol amide and the like may be used for this purpose.

The alkyl groups contained in the nonionic surfactants described above may include, for example, straight-chain or branched saturated or unsaturated alkyl groups having 4 to 30 carbon atoms. Also, the polyalkylene groups described above may include those having alkylene groups having 2 to 4 carbon atoms such as, for example, ethylene oxide of which the number of moles added is about 1 to 50. Also, the fatty acids described above may include, for example, straight-chain or branched saturated or unsaturated fatty acids having 4 to 30 carbon atoms.

(c) Amphoteric surfactant

The amphoteric surfactants may include an amino acid type surfactant, a betaine type surfactant, an imidazoline type surfactant, an amineoxide type surfactants and the like.

The amino acid type surfactants may include salts of acylamino acid, salts of acylsarcosine, acyloylmethyl aminopropionates, alkylamino propionates, acylamidoethyl aminohydroxyethylmethyl carboxylates and the like.

The betaine type surfactants may include alkyldimethyl betaine, alkylhydroxyethyl betaine, acylamidopropyl hydroxypropyl ammoniosulfobetaine, amidopropyl dimethylcarboxymethyl ammoniobetaine ricinoleates and the like.

The imidazoline type surfactants may include alkylcarboxymethyl hydroxyethyl imidazolinium betaine, alkylethoxy carboxymethyl carboxymethyl imidazolinium betaine and the like.

The amineoxide type surfactants may include alkyldimethyl amineoxide and the like.

In order to ensure that the surfactant exhibits the above-described function and maintains the strength of a product, it is preferably used in an amount of 0.1 to 10 parts by weights based on 100 parts by weights of the solid content of the natural rubber latex and more preferably 0.5 to 5 parts by weight.

In the first step, an excessive increase or decrease in concentration of the solid content of the natural rubber latex fails to ensure smooth progress of a decomposition reaction of the protein. In order to avoid the disadvantage, the natural rubber latex is preferably selectively diluted or concentrated with water so as to keep the solid content of the natural rubber latex at a concentration within a range of about 10 to 60% by weight.

Conditions under which the procedure of the first step takes place are not limited to any specific ones so long as the conditions promote satisfactory progress of the enzyme reaction. For example, a smooth decomposition reaction of the protein may take place at a temperature at about 5 to 90° C. and preferably about 20 to 60° C. for about 2 minutes to about 24 hours while being left to stand or stirred. Although addition of the surfactant may be carried out either during the decomposition procedure or thereafter, it is preferably carried out during the decomposition procedure. Also, prior to the reaction, the enzyme is preferably adjusted to an optimum pH value by means of a suitable pH adjustor. In this instance, a dispersing agent may be used in combination therewith.

In the first step, such a deproteinizing agent as in the fourth aspect of the present invention detailedly described hereinafter may be used.

The second step or prevulcanization step is to improve workability in the forming step subsequent thereto.

In the second step, prevulcanization may takes place using any suitable techniques known in the art such as, for example, a sulfur vulcanization system, a non-sulfur vulcanization system, a peroxide vulcanization system or a radiation vulcanization system.

Vulcanizing agents may include sulfur, sulfur chloride, precipitated sulfur, insoluble sulfur, selenium and tellurium, as well as sulfur-containing organic compounds such as tetramethyl thiuram sulfide, tetraethyl thiuram sulfide and the like, organic peroxides such as benzoyl peroxide, dicumyl peroxide and the like, and metal oxides such as zinc oxide, magnesium oxide, zinc peroxide and the like. Also, vulcanization accelerators may include those known in the art such as aldehyde ammonias, aldehyde amines, guanidines, thioureas, thiazoles, thiurams, sulfenamides, dithiocarbamates, xanthates and the like. Also, any suitable vulcanization supplement accelerator, plasticizer, curing agent, filler, antioxidant and the like which are known in the art may be added as required.

Conditions for the prevulcanization are suitably determined depending on the amount of natural rubber latex and the like. Normally, the prevulcanization is preferably carried out at a temperature of about 20 to 60° C. for about 0.1 to 24 hours. Radiation vulcanization may take place in a manner known in the art using a sensitizer such as acrylic ester. In this instance, intensity of the radiation may be suitably determined depending on a composition of the natural rubber latex, a forming manner and the like. Normally, it is preferably about 1.0 to 5 Mrad.

The third step or forming step is to make an intermediate formed product of the natural rubber latex. Prior to the third step, aqueous ammonia may be added to the natural rubber latex in order to stabilize it as required. The forming step is not limited to any specific manner and may employ any suitable techniques known in the art such as, for example, straight dip forming, casting, extrusion or the like depending on a form of a product to be formed, applications thereof and the like.

The fourth step or cleaning removal step is to clean the formed product with the cleaning liquid to remove the non-rubber content therefrom.

The cleaning removal step is carried out in order to remove the non-rubber content from the formed product by extraction and clean a surface of the product. The term "non-rubber content" used in connection with the cleaning removal step herein indicates, of a non-rubber ingredient added during production of the product and originally contained in the natural rubber latex, a part harmful to the human body or unnecessary to keep satisfactory quality of the product. For example, the non-rubber contents include the protease, surfactant, vulcanization accelerator and proteolysis products.

The cleaning liquid may be at least one selected from the group consisting of (i) aqueous alkali solution, ammonia, (ii)

water containing free chlorine in an amount of 0.005 to 0.02% by weight and (iii) alcohol-water mixed liquid containing 5 to 80% by weight of alcohol. In the fourth step, it is desirable that the amount of cleaning liquid used and conditions for the cleaning are suitably varied depending on a type of the cleaning liquid. Now, details of the cleaning liquid and conditions for the cleaning will be described hereinafter.

(i) Aqueous alkali solution, ammonia

An aqueous solution of alkali such as sodium hydroxide, potassium hydroxide or ammonia which is used for the cleaning procedure may be 0.1 to 1.0% aqueous NaOH solution, 0.1 to 1.0% aqueous KOH solution or 0.001 to 1.0% aqueous ammonia solution. The cleaning liquid may have a silicone emulsion or a surfactant added thereto in an amount of 0.01 to 1.0% so as to function as a detackifier. Also, in order to further decrease tackiness of the product, a fine powder of talk, cornstarch, silica or the like may be applied in a dry state or in the form of slurry to a surface of the intermediate formed product. Alternatively, the surface of the formed product may be subject to a chlorine gas treatment for this purpose.

The cleaning treatment or procedure is not limited to any specific manner so long as it permits the formed product to be fully contacted with the cleaning liquid. For example, the cleaning procedure may be carried out by placing the formed product and cleaning liquid at a weight ratio of about 1:10 to 1000 in a suitable container and leaving them to stand therein while being stirred as required.

The cleaning treatment using the above-described aqueous alkali solution or ammonia solution preferably takes place at a temperature of 20 to 100° C. for several minutes to 24 hours.

The cleaning step may be repeated twice or more depending on the amount of the non-rubber content to be removed and the like. The second-time and subsequent executions of the cleaning step are preferably at a temperature equal to or higher than that of the first-time execution. Also, when the cleaning step is repeated twice or more, a stripping step is carried out between each two of the executions of the cleaning step. The stripping step is practiced manually or using any suitable means such as a rotary brush, pressurized water, compressed air or the like.

(ii) Water containing 0.005 to 0.02% by weight of free chlorine:

The amount of free chlorine contained in the cleaning liquid is 0.005 to 0.02% by weight and preferably 0.005 to 0.01% by weight for such reasons as indicated below.

Such water containing free chlorine may be prepared by blowing chlorine gas into water or charging hypochlorite in water. A content of free chlorine in water may be measured by placing the cleaning liquid in an aqueous solution containing an excessive amount of potassium iodide to isolate iodine and subjecting the thus isolated iodine to back titration.

A treatment of natural rubber with chlorine water has been conventionally carried out in order to enhance lubricating properties of a natural rubber glove and improve fittingness thereof. Also, it is known in the art that the treatment contributes to a decrease in protein constituting an allergen. However, chlorine water conventionally used for this purpose has a chlorine content as high as 0.06% by weight or more. Cleaning of a formed rubber product and extraction of proteolysis products which are carried out using chlorine water of such an increased chlorine content render a surface of the formed rubber product coarse due to chlorination, to thereby cause an increase in surface area of the product, resulting in the proteolysis products beings extracted at an increased speed during an initial stage of the cleaning treatment. However, as chlorination advances, the surface of formed rubber product is changed in properties, to thereby impede molecular motion on the surface or amino acids which are residues of decomposition of the protein are polymerized by oxidation to form a film on the surface of the product. This causes insufficient extraction of the proteolysis products, resulting in a failure in satisfactory cleaning of the product. On the contrary, the present invention effectively eliminates such a deterioration in cleaning effect with progress of chlorination as encountered with the prior art, because the chlorine content is kept at a level as low as 0.02% by weight or less.

The cleaning liquid is used in an amount of 10 to 1000 g per gram of the intermediate formed product of natural rubber latex. The formed latex product is kept dipped in the cleaning liquid for 1 to 24 hours while being left to stand or stirred, resulting in being cleaned. The cleaning liquid is kept at a temperature below a boiling point thereof and normally at 25 to 50° C.

(iii) Alcohol-water mixed liquid containing 5 to 80% by weight of alcohol:

Alcohol contained in alcohol-water mixed liquid may be selected from aliphatic alcohol having 1 to 5 carbon atoms and aliphatic alcohol having 1 to 5 carbon atoms which is replaced with an alkoxy group having 1 to 2 carbon atoms. More specifically, the alcohols may include methanol, ethanol, n-propanol, isopropyl alcohol (IPA), 2-methyl-1-propanol, 2-methyl-2-propanol, n-butanol, n-pentanol, the above-described alcohols replaced with a methoxy or ethoxy group, and the like. In particular, methanol, ethanol, isopropyl alcohol (IPA) and 3-methyl-3-methoxybytanol (MMBA) are preferably used.

Such alcohol-water mixed liquid has an alcohol content of 5 to 80% by weight so as to ensure swelling of the formed product and exhibit a satisfactory cleaning effect. An alcohol content in the cleaning liquid is preferably within a range between 10% by weight and 50% by weight.

The alcohol-water mixed liquid is used at a ratio of 10 to 1000 g per gram of the latex formed product. The formed latex product is kept dipped in the cleaning liquid for 1 to 24 while being left to stand or stirred, resulting in being cleaned. The cleaning liquid is kept at a temperature below an azeotropic point thereof and normally at 25 to 50° C.

Such cleaning of the formed natural rubber latex product with the alcohol-water mixed liquid permits the non-rubber content to be removed with increased efficiency. Now, the reason will be considered hereinafter.

In general, it is considered that in cleaning of natural rubber latex, cleaning liquid (water) leads to swelling of a formed latex product to a degree sufficient to facilitate extraction of a non-rubber content from the product. However, although cleaning of the product with only water permits the product to initially swell, it gradually fails to swell with removal of hydrophilic substances such as hydrophilic protein and the like, leading to a deterioration in cleaning effect of the waters. On the contrary, use of the alcohol-water mixed liquid as the cleaning liquid in the present invention permits alcohol contained in the liquid to exhibit affinity for the formed product; so that even when such hydrophilic substances as described above are removed, the affinity permits the formed latex product to be kept swollen, resulting in the cleaning liquid continuously exhibiting a stable cleaning function.

The alcohol-water mixed liquid may contain free chlorine. The chlorine content is preferably 0.005 to 0.02% by weight and more preferably 0.005 to 0.01% by weight. The alcohol-water mixed liquid containing free chlorine may be used for the cleaning treatment in substantially the same manner as the alcohol-water mixed liquid. When a temperature for the cleaning is kept at a high level, the chlorine content is increased; whereas when it is low, the chlorine content is decreased. This results in the cleaning conditions being rendered appropriate.

The fifth step or postvulcanization step is to subject the intermediate formed product from which the non-rubber content including the proteolysis products has been removed by the cleaning treatment described above to a postvulcanization treatment, to thereby provide a final formed product. When the formed product which has been subject to the cleaning treatment may take the form of a final formed product desired, the postvulcanization step may be eliminated.

Conditions employed in postvulcanization step are not limited to any specific ones. Normally, the postvulcanization treatment is preferably carried out at a temperature of about 70 to 120° C. for about 0.1 to 24 hours.

The first aspect of the present invention eliminates dilution and concentration steps which are required in the prior art, to thereby simplify production of the formed natural rubber latex product, resulting in a period of time required for the production being significantly reduced and yields of the product being substantially improved. Also, the first aspect of the present invention permits an allergen content of the product to be decreased to a level sufficient to render the product harmless to the human body.

Now, the method for producing a formed product of deproteinized natural rubber latex according to the second aspect of the present invention will be described hereinafter. The second aspect, as noted from the above, is featured in that the mechanical removal step for mechanically removing an impurity from the latex is interposedly incorporated between the protein decomposition step and the prevulcanization step each described above in connection with the first aspect of the present invention. The term "impurity" used in connection with the second aspect of the present invention has substantially the same meanings as the term "non-rubber content" indicated above, except that it is free of the vulcanization accelerator and the like because the mechanical removal step takes place prior to the prevulcanization step.

A mechanical removal treatment in the step may be executed by centrifuging or ultrafiltration. The centrifuging procedure is carried out in a manner to subject the latex to centrifuging to obtain a serum (heavy liquid component) and then concentrate a rubber content contained in the serum to purify it. In the ultrafiltration procedure, only proteolytics are filtered out by means of an ultrafilter.

Thus, it will be noted that the second aspect of the present invention permits the natural rubber product to be further decreased in allergen content.

Now, the method for producing a formed product of deproteinized natural rubber latex according to the third aspect of the present invention will be described hereinafter. The third aspect, as described above, is featured in that the mechanical removal step for mechanically removing an impurity from the latex is interposedly incorporated between the prevulcanization step and the forming step described above in connection with the first aspect of the present invention. The term "impurity" used in connection with the third aspect of the present invention has substantially the same meanings as the term "non-rubber content" indicated above.

The mechanical removal treatment in the third aspect may be practiced in substantially the same manner as that in the second aspect.

Thus, it will be noted that the third aspect of the present invention likewise permits the formed natural rubber latex product to be further decreased in allergen content.

Now, the deproteinizing agent for natural rubber latex (hereinafter referred to as "deproteinizing agent") according to the fourth aspect of the present invention will be described hereinafter.

The protease used in the fourth aspect of the present invention may comprise any suitable protease known in the art. In particular, an alkali protease is preferably used in the fourth aspect of the present invention. A source or derivation of the protease is not limited to any specific one. Thus, the proteases may include a bacteria-derived protease, a mold-derived protease, a yeast-derived protease and the like. Of such proteases, the bacteria-derived is preferably used for this purpose. In the fourth aspect of the present invention, the protease may be used in combination with any suitable other enzyme such as, for example, cellulase, amylase, lipase, esterase or the like as required.

The nonionic surfactants having LD 50 of 5000 mg/kg or more which is suitable for use for the deproteinizing agent may include an activator of the polyhydric alcohol ester type of which LD 50 is 5000 mg/kg or more, an activator of the polyoxyalkylene type having LD 50 of 5000 mg/kg, an activator of the polyhydric alcohol ether type having LD 50 of 5000 mg/kg and the like.

The activators of the polyhydric alcohol ester type may include polyoxyalkylene sorbitan fatty acid ester, polyoxyalkylene glycerin fatty acid ester, polyglycerin fatty acid ester, sorbitan fatty acid ester, glycerin fatty acid ester, sucrose fatty acid ester and the like. The activators of the polyoxyalkylene type may include polyoxyethylene fatty acid ester, polyoxyethylene-oxypropylene block copolymer, polyoxyalkylene alkylether and the like. The activators of the polyhydric alcohol ether type may include alkyl (poly) glycoside, polyoxyethylene alkyl (poly)glycoside and the like. The surfactants may be used solely or in combination with each other.

In the deproteinizing agent, the protease and nonionic surfactant are preferably combined together at a weight ratio within a range between 1:1 and 1:5000.

The deproteinizing agent may have an excipient and/or a filler incorporated therein, resulting in taking any desired form such as a powder-like form, a liquid form containing water, a solid-like form or the like, as required. The deproteinizing agent may be charged in the natural rubber latex material during the deproteinizing treatment.

The amount of deproteinizing agent used may be suitably adjusted depending on a content of protein in the natural rubber latex material and a composition of the protease and surfactant in the deproteinizing agent. For example, in order to ensure a suitable protein decomposition reaction, and stability and cleaning properties of the product, as well as satisfactory formability of the product, the components of the deproteinizing agent are preferably used in amounts within ranges indicated below.

More specifically, the protease may be used in an amount of 0.0005 to 5.0 parts by weight based on 100 parts by weight of the solid content of the natural rubber latex, preferably 0.001 to 1.0 parts by weight, and more preferably 0.01 to 0.1 parts by weight. The surfactant may be used in an amount of 0.1 to 10 parts by weight based on 100 parts by weight of the solid content of the natural rubber latex and preferably 0.5 to 5 parts by weight.

Application of the deproteinizing agent to the protein decomposition step in production of the deproteinized natural rubber latex contributes to an improvement in protein cleaning and stability of the latex, as well as an improvement in film forming property in the subsequent forming step, in particular, the forming step in which straight dipping is employed. Also, the surfactant contained in the deproteinizing agent has LD 50 as high as 5000 mg/kg, resulting in exhibiting increased safety. Thus, even when the surfactant remains in the product, it is kept from being harmful to the human body.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein:

FIG. 1 is a flow chart showing a method for producing a formed natural rubber latex product practiced in each of Examples 1 to 5;

FIG. 2 is a flow chart showing a method practiced in Comparative Example 1;

FIG. 3 is a flow chart showing a method practiced in each of Comparative Examples 2 and 3.

DETAILED DESCRIPTION OF THE INVENTION

Figure 4:
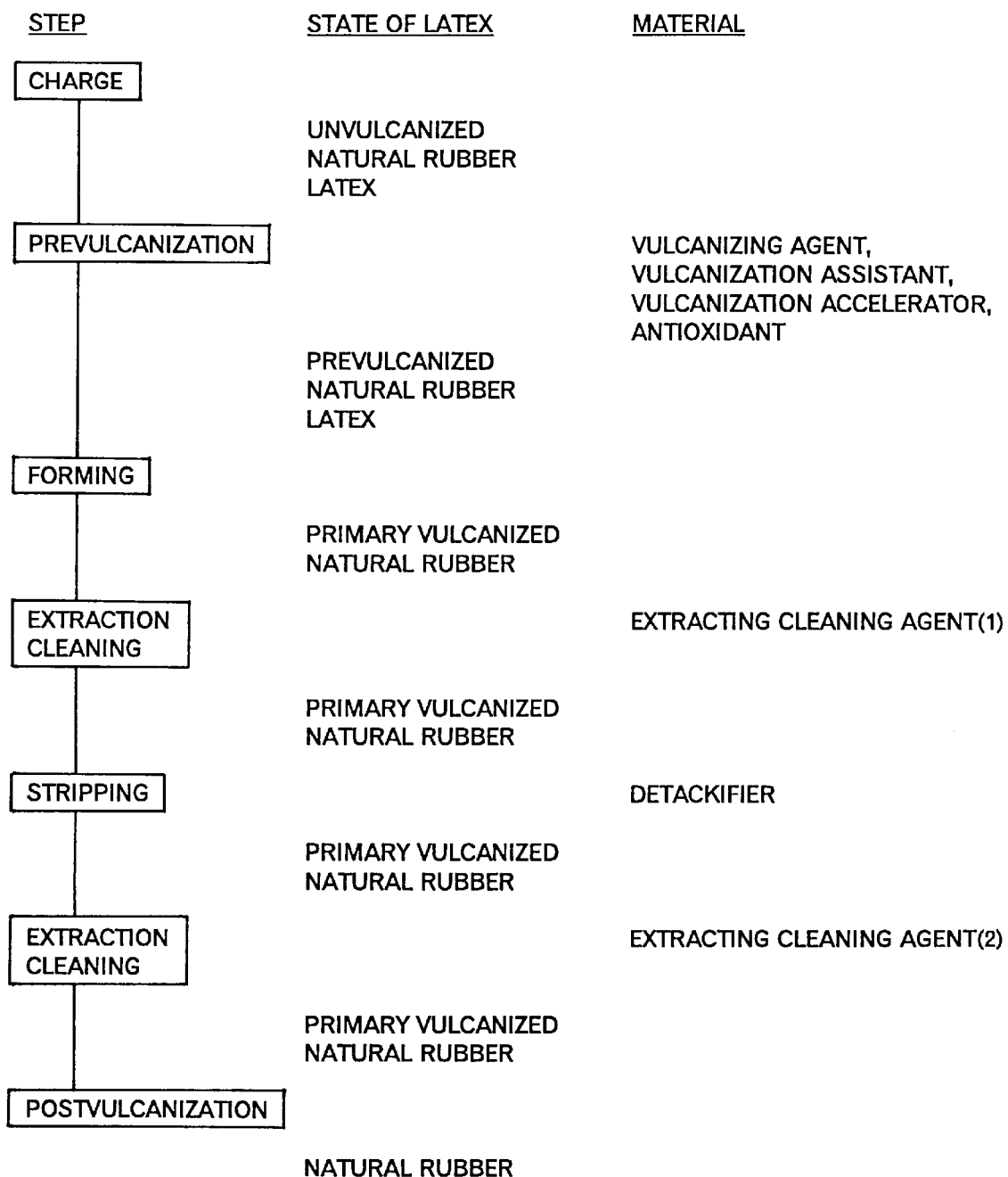
FIG. 4 is a flow chart showing a method practiced in Comparative Example 4.

The invention will be understood more readily with reference to the following example; however, these examples are intended to illustrate the invention and are not to be construed to limit the scope of the invention.

EXAMPLE 1

(1) Protein decomposition step 10 g of aqueous potassium laurate solution (solid content concentration: 20%) acting as a surfactant and 0.5 g of protease were added to 167 g of high-ammonia natural rubber latex (from Malaysia, solid content concentration: 60%, total nitrogen content: 0.200%) to prepare a reaction system, which was then uniformly dispersed and kept at 50° C. for 5 hours.

(2) Prevulcanization step

Then, the reaction system was left to stand, resulting in being cooled and thereafter 4 g of sulfur dispersion (solid content concentration: 50%), 2 g of zinc oxide dispersion (solid content concentration: 50%), 1 g of zinc di-n-butyl dithiocarbamate (solid content concentration: 50%, total nitrogen content: 0.06%) acting as a vulcanization accelerator and 1 g of phenolic type antioxidant dispersion (solid content concentration: 50%, total nitrogen content: 0%) acting as an antioxidant were added to the reaction system. Subsequently, the reaction system was heated at 50° C. for 15 hours while being stirred, resulting in latex which contains a non-rubber content (protease, surfactant, vulcanization accelerator, proteolysis products and the like) being obtained.

(3) Forming step

Then, the latex thus prepared was cast on a glass plate and left to stand at a room temperature for 24 hours, so that an intermediate product formed into a film-like shape was provided in an amount of 106.7 g.

(4) Cleaning step

Subsequently, 106.7 g of film-like intermediate formed product and 10 kg of 0.1% aqueous sodium hydroxide solution were added to an extraction cleaning tank (volume: 20 liters) and kept at 40° C. for 2 minutes while being stirred.

(5) Postvulcanization

Then, the intermediate formed product was removed the extraction cleaning tank and then subject to postvulcanization at 90° C. for 30 minutes, resulting in a final formed product in the form of a film being obtained in an amount of 104.2 g. Results of measurement of yields of the film and a total nitrogen content thereof were as shown in Table 1.

(Protein Content)

The protein content was measured according to a Kjeldahl method (Y. Tanaka et al, J. Nat. Rubb. Res. 7(2), pp 152–155 (1992)).

(Yields)

The yields were calculated according to the following expression:

$$\text{Yields } (\%) = (\text{weight of product after postvulcanization})/(\Sigma \text{solid content concentration in latex material}) \times 100$$

EXAMPLES 2 TO 5

In each of Examples 2 to 5, a formed natural rubber latex product was produced according to a process shown in FIG. 1. A natural rubber latex material for the formed product was the same as that in Example 1 and subject to the same treating procedure and conditions as those in Example 1. A cleaning step was executed twice under conditions shown in Table 1 and a stripping step was executed between the two executions of the cleaning step. A treatment in the stripping step was carried out using a detackifier containing 0.1% of silicone emulsion and 1% of cornstarch. The yields and total protein content were as shown in Table 1.

COMPARATIVE EXAMPLE 1

A formed natural rubber product was obtained according to a process shown in FIG. 2. A natural rubber latex material for the formed product was the same as that in Example 1 and subject to the same treating procedure and conditions as those in Example 1. Centrifuging was carried out using a De. Laval type centrifugal separator (acceleration during centrifuging: about 10000 G), resulting in a solid content thereof being concentrated to about 65%. The yields and total protein content were as shown in Table 1.

COMPARATIVE EXAMPLES 2 and 3

A formed natural rubber product was obtained according to a process shown in FIG. 3. A natural rubber latex material therefor was the same as that in Example 1 and subject to the same treating procedure and conditions as those in Example 1. Centrifuging was carried out under the same conditions as in Comparative Example 1. The yields and total protein content were as shown in Table 1.

COMPARATIVE EXAMPLE 4

A formed natural rubber product was obtained according to a process shown in FIG. 4. A natural rubber latex material therefor was the same as that in Example 1 and subject to the same treating procedure and conditions as those in Example 1. The yields and total protein content were as shown in Table 1.

TABLE 1

| | Conditions for cleaning treatment | | Yields | Total N |
|---|---|---|---|---|
| | 1st time | 2nd time | (%) | content (%) |
| Example | | | | |
| 1 | 0.1% NaOH, 40° C., 2 min | — | 98 | 0.045 |
| 2 | 0.1% NaOH 40° C., 2 min | 0.1% NaOH 40° C., 24 hr | 98 | 0.039 |
| 3 | 0.1% $NH_3$ 40° C., 2 min | 0.1% $NH_3$ 40° C., 24 hr | 98 | 0.042 |
| 4 | 0.1% NaOH 40° C., 2 min | 0.1% NaOH 100° C., 0.5 hr | 98 | 0.017 |
| 5 | 0.1% $NH_3$ 40° C., 2 min | 0.1% $NH_3$ 100° C., 0.5 hr | 98 | 0.020 |
| Comparative Example | | | | |
| 1 | 0.1% NaOH, 40° C., 2 min | — | 85 | 0.037 |
| 2 | 0.1% NaOH, 40° C., 2 min | — | 85 | 0.022 |
| 3 | 0.1% $NH_3$ 40° C., 2 min | 0.1% $NH_3$ 40° C., 24 hr | 85 | 0.020 |
| 4 | 0.1% NaOH 40° C., 2 min | — | 98 | 0.280 |

As will be noted from Table 1, the formed natural rubber product obtained in Example 1 was 98% in yields. Also, it was decreased in total nitrogen content to a level as low as 0.045%. The formed product obtained in each of Examples 2 to 5 in which the cleaning treatment took place twice was further decreased in total nitrogen content while having yields kept at a level as high as 98%.

On the contrary, although the formed product obtained in Comparative Example 1 was decreased in total nitrogen content, it was deteriorated in yields because of being increased in the number of steps for production and it disadvantageously required a long period of time for production. Thus, Comparative Example 1 was disadvantageous from an industrial point of view.

Also, Comparative Examples 2 and 3 each substantially reduced a total nitrogen content of the formed product, however, those led to both an increase in capital investment and a decrease in yields because of requiring the centrifuging step.

Further, Comparative Example 4 increased the yields because of being decreased in number of steps, however, it caused a total nitrogen content remaining in the formed natural rubber product to be excessive, to thereby fail to provide the formed product with satisfactory safety.

EXAMPLES 6 TO 14, COMPARATIVE EXAMPLES 5 TO 8

(1) Protein decomposition step

Commercially available high-ammonia natural rubber latex (rubber solid content: 60%, ammonia content: 0.7%) was employed and a nonionic-anionic composite surfactant and protease were added to the latex in amounts of 1% by weight and 0.02% by weight based on the rubber solid content of the latex, respectively, resulting in a reaction system being prepared. Then, the reaction system was subject to an enzyme reaction at 40° C. for 24 hours.

Emal E-70C and alkali protease each manufactured by Kao Corporation were used as the nonionic-anionic composite surfactant and protease, respectively.

(2) Prevulcanization step 1 part by weight of sulfur, 1 part by weight of zinc oxide and 0.6 part by weight of zinc di-n-butyl dithiocarbamate were added to the latex thus subjected to the enzyme reaction, which was then subject to prevulcanization at 30° C. for 24 hours, resulting in prevulcanized latex being obtained.

(3) Forming step

The prevulcanized latex thus obtained was then subject to straight dip forming, to thereby provide a glove made of a rubber film having an average thickness of 0.25 mm.

(4) Cleaning step

The rubber glove thus formed was cleaned in each of cleaning liquids (see Table 2) while stirring the liquid under conditions shown in Table 2. The cleaning liquids each were used in an amount of 300 g per gram of the rubber glove. Comparative Example 5 did not carry out the cleaning treatment. The cleaning liquid used in Comparative Example 6 was pure water.

(5) Postvulcanization

Then, the rubber glove was removed from the cleaning liquid and then subject to postvulcanization at 90° C. for 30 minutes, to thereby obtain a final formed product.

(Evaluation of cleaning effect)

Evaluation of a cleaning effect in each of Examples 6 to 14 and Comparative Examples 5 to 8 was made in a manner described below using a sample made by cutting the rubber glove subjected to the cleaning step into a size of 2 cm×2 cm. A sample obtained each of the gloves prior to the cleaning step and the sample cleaned in each of the examples and comparative examples were dried and then subject to protein extraction at 40° C. for 1 hour using pure water in an amount of 5 ml per 400 mg of each sample. A protein-analogous material extracted was subject to 750 nm absorbance measurement according to a direct determination preventing precipitation of protein by means of a protein determining kit (Procedure No. 5656) of SIGMA using an improved Lowry reagent. Then, a protein content of the extracted liquid was calculated in terms of albumin based on a calibration curve prepared using albumin as a standard material. Then, the protein content thus calculated was turned into a value per the formed product sample, which was employed as a residual protein content.

TABLE 2

| | Alcohol | *1 (wt %) | *2 (wt %) | *3 (° C.) | *4 (hr) | *5 (µg/g) |
|---|---|---|---|---|---|---|
| Example | | | | | | |
| 6 | ethanol | 50 | 0 | 40 | 24 | 70 |
| 7 | ethanol | 50 | 0.005 | 25 | 24 | 55 |
| 8 | ethanol | 50 | 0.010 | 25 | 24 | 50 |
| 9 | ethanol | 50 | 0.020 | 25 | 24 | 60 |
| 10 | ethanol | 25 | 0.010 | 25 | 24 | 45 |
| 11 | ethanol | 75 | 0.010 | 25 | 24 | 52 |
| 12 | methanol | 50 | 0.010 | 25 | 24 | 75 |
| 13 | IPA | 50 | 0 | 40 | 24 | 55 |
| 14 | MMBA | 10 | 0 | 40 | 24 | 60 |

TABLE 2-continued

| | Alcohol | *1 (wt %) | *2 (wt %) | *3 (° C.) | *4 (hr) | *5 (μg/g) |
|---|---|---|---|---|---|---|
| Comparative Example | | | | | | |
| 5 | — | — | — | — | — | 7964 |
| 6 | — | 0 | 0 | 40 | 24 | 700 |
| 7 | — | 0 | 0.044 | 25 | 24 | 1360 |
| 8 | ethanol | 90 | 0.010 | 25 | 24 | 1200 |

*1 Alcohol content in cleaning liquid
*2 Concentration of free chlorine in cleaning liquid
*3 Cleaning temperature
*4 Cleaning period
*5 Residual protein content

EXAMPLES 15 TO 17, COMPARATIVE EXAMPLE 9 TO 11

The examples and comparative examples were practiced in substantially the same manner as Examples 6 to 14 and Comparative Examples 5 to 8 described above, to thereby produce a rubber glove made of a rubber film having an average thickness of 0.25 mm. A composition of a cleaning liquid, a cleaning temperature and a cleaning period which were employed in each of the examples and comparative examples are shown in Table 3. Comparative Example 9 did not carry out cleaning and Comparative Example 10 used pure water as the cleaning liquid.

(Evaluation of cleaning effect)

Evaluation of a cleaning effect in each of Examples 15 to 17 and Comparative Examples 9 to 11 was made in substantially the same manner as Examples 6 to 14 using a sample made by cutting the rubber glove after the cleaning step into a size of 2 cm×2 cm. The results were as shown in Table 3.

TABLE 3

| | Concentration of free chlorine in treating liquid (wt %) | Cleaning temperature (° C.) | Cleaning period (hr) | Residual protein content (μg/g) |
|---|---|---|---|---|
| Example | | | | |
| 15 | 0.020 | 25 | 24 | 253 |
| 16 | 0.010 | 25 | 24 | 50 |
| 17 | 0.005 | 40 | 24 | 30 |
| Comparative Example | | | | |
| 9 | — | — | — | 7964 |
| 10 | 0 | 25 | 24 | 1485 |
| 11 | 0.044 | 25 | 24 | 1360 |

EXAMPLE 18

(1) Protein decomposition step

A field latex (rubber solid content: 30%) was used as a natural rubber latex material. Then, a nonionic-anionic composite surfactant and protease were added to the latex in amounts of 1% by weight and 0.02% by weight based on the rubber solid content of the latex, respectively, resulting in a reaction system being provided. Then, the reaction system was subject to an enzyme reaction at 40° C. for 24 hours.

Latex manufactured by FELDA in Malaysia was used as the field latex material. Also, Emal E-70C (sodium polyoxyethylene lauryl ether sulfate) and alkali protease each manufactured by Kao Corporation were used as the nonionic-anionic composite surfactant and protease, respectively.

(2) Centrifuging step

After the enzyme reaction, the rubber latex material was diluted with water, resulting in the rubber solid content being 10% and then subject to concentration and purification by means of a De. Laval type centrifugal separator (acceleration during centrifuging: about 10000 G), resulting in the rubber solid content being 65%. A cream obtained by the concentration and purification step was diluted with water so as to reduce the rubber content to a level as low as 10% and then centrifuged again. This resulted in deproteinized natural rubber latex of which the rubber solid content is 65% and a nitrogen (N) content in raw rubber is 0.007% being obtained.

(3) Prevulcanization step 1 part by weight of sulfur, 1 part by weight of zinc oxide and 0.6 part by weight of zinc di-n-butyl dithiocarbamate were added to the latex thus obtained, which was then subject to prevulcanization at 30° C. for 24 hours, resulting in prevulcanized latex being obtained.

(4) Forming step

The prevulcanized latex thus obtained was then subject to straight dip forming, to thereby provide a glove made of a rubber film having an average thickness of 0.25 mm.

(5) Cleaning step

The rubber glove thus formed was cleaned in each of cleaning liquids while stirring the liquid. The cleaning liquids each were used in an amount of 300 g per gram of the rubber glove. Conditions and the like for the cleaning step were as shown in Table 4.

(6) Postvulcanization

Then, the rubber glove was removed from the cleaning liquid and then subject to postvulcanization at 90° C. for 30 minutes, to thereby obtain a final formed product.

(Evaluation of cleaning effect)

Evaluation of a cleaning effect in Example 18 was made in substantially the same manner as Examples 6 to 14 using a sample made by cutting the rubber glove after the cleaning step into a size of 2 cm×2 cm. The results were as shown in Table 4.

EXAMPLES 19 TO 26 AND COMPARATIVE EXAMPLES 12 TO 16

The examples and comparative examples were practiced in substantially the same manner as Example 18 described above, to thereby produce a rubber glove of deproteinized natural rubber latex. Conditions therefor were as shown in Table 4. Comparative Example 12 did not carry out cleaning and Comparative Example 13 used pure water as the cleaning liquid. Then, samples were prepared in substantially the same manner as Example 18 described above and evaluation of a cleaning effect in each of the examples and comparative examples was made. The results were as shown in Table 4.

TABLE 4

| | Alcohol | *1 (wt %) | *2 (wt %) | *3 (° C.) | *4 (min) | *5 (μg/g) |
|---|---|---|---|---|---|---|
| Example | | | | | | |
| 18 | ethanol | 50 | 0 | 40 | 30 | 40 |
| 19 | ethanol | 50 | 0.005 | 25 | 15 | 32 |
| 20 | ethanol | 50 | 0.010 | 25 | 15 | 30 |
| 21 | ethanol | 50 | 0.020 | 25 | 15 | 38 |
| 22 | ethanol | 25 | 0.010 | 25 | 15 | 25 |
| 23 | ethanol | 75 | 0.010 | 25 | 15 | 32 |
| 24 | methanol | 50 | 0 | 25 | 15 | 35 |
| 25 | IPA | 50 | 0 | 40 | 30 | 25 |
| 26 | MMBA | 10 | 0 | 40 | 30 | 30 |
| Comparative Example | | | | | | |
| 12 | — | — | — | — | — | 180 |
| 13 | — | 0 | 0 | 40 | 30 | 100 |
| 14 | — | 0 | 0.066 | 25 | 15 | 120 |
| 15 | ethanol | 1 | 0.010 | 25 | 15 | 90 |
| 16 | methanol | 90 | 0.010 | 25 | 15 | 100 |

*1 Alcohol content in cleaning liquid
*2 Concentration of free chlorine in cleaning liquid
*3 Cleaning temperature
*4 Cleaning period
*5 Residual protein content

EXAMPLE 27

(1) Protein decomposition step 3 parts by weight of polyoxyethylene (20) sorbitan monooleate (nonionic surfactant, LD 50>15000 mg/kg) and 0.05 part by weight of protease acting as a deproteinizing agent were added to 100 parts by weight of high-ammonia natural rubber latex (from Malaysia, solid content concentration: 60%, total nitrogen content: 0.200%) to prepare a reaction system, which was then uniformly dispersed and kept at 50° C. for 5 hours.

(2) Prevulcanization step

Then, the reaction system was left to stand, resulting in being cooled and thereafter 2 parts by weight of sulfur, 1 part by weight of zinc oxide, 0.5 part by weight of zinc di-n-butyl dithiocarbamate (total nitrogen content: 0.06%) acting as a vulcanization accelerator and 0.5 part by weight of phenolic type antioxidant (total nitrogen content: 0%) acting as an antioxidant were added to the reaction system. Subsequently, the reaction system was heated at 50° C. for 15 hours while being stirred, resulting in latex which contains a solid content of about 60% being obtained.

(3) Centrifuging step

Then, the latex thus obtained was left to stand, resulting in being cooled and then pure water was added to the latex so that a solid content thereof is 20%. Thereafter, the latex was centrifuged by means of a De. Laval type centrifugal separator (acceleration during centrifuging: about 10000 G), resulting in the rubber solid content being 65%. Subsequently, the latex was diluted with pure water so that the solid content is 20%, followed by centrifuging again under the same conditions.

(4) Forming step

Then, 1% ammonia was added to the latex thus centrifuged to dilute the latex so that the solid content is 60%. Then, a glass mold formed into a shape like a test tube was directly dipped in the latex and then drawn up therefrom, followed by heating at 90° C. for 5 minutes in an oven for drying of the latex, resulting in an intermediate formed product being obtained.

(5) Cleaning step

Subsequently, the intermediate formed product (as adhered to the glass mold) and 0.1% aqueous sodium hydroxide solution were added at a weight ratio of 1:100 (based on weight of only the formed product other than the glass mold) to an extraction cleaning tank and kept at 40° C. for 2 minutes while being stirred.

(6) Stripping step

A stripping step was executed using a detackifier containing 0.1% of silicone emulsion and 1% of cornstarch, to thereby strip the formed product from the glass mold.

(7) Cleaning step

A cleaning procedure was carried out under substantially the same conditions as the foregoing cleaning step (5) except that the intermediate formed product was kept at 100° C. for 0.5 hour.

(8) Postvulcanization

Then, the intermediate formed product was removed from the extraction cleaning tank and then subject to postvulcanization at 90° C. for 30 minutes, resulting in a final formed product. A total nitrogen content of the final formed product was determined according to a Kjeldal method, resulting in being indicated to be less than 0.05%.

Stability of the latex after each of the prevulcanization step and centrifuging step and filmization of the latex in the forming step using straight dip forming were visually observed according to criteria indicated below. The results were as shown in Table 5.

(Stability)

In Table 5, "0" indicates that the latex was uniformly dispersed without coagulating and causing an increase in viscosity and "X" indicates that the latex coagulated and was increased in viscosity.

(Film forming property)

In Table 5, 0 indicates that the latex exhibited improved film forming property and was uniform in thickness and X indicates that the latex exhibited excessive sagging, was decreased in speed of film forming property and was non-uniform in thickness.

EXAMPLES 28 AND 29

A formed rubber product was produced according to substantially the same procedure in Example 27 described above, except that a content of polyoxyethylene (20) sorbitan monooleate therein was 4 parts by weight in Example 28 and 5 parts by weight in Example 29. A total nitrogen content of the formed product obtained in each of Examples 28 and 29 was determined according to a Kjeldal method, resulting in being indicated to be less than 0.05%. Also, the formed products of the examples were subject to substantially the same tests as in Example 27 described above. The results were as shown in Table 5.

COMPARATIVE EXAMPLES 17 TO 19

In each of the comparative examples, a formed rubber product was produced according to substantially the same procedure in Example 27 described above, except that sodium polyoxyethylene (3) lauryl ether sulfate which is a nonionic surfactant was used in an amount of 3 parts by weight in Comparative Example 27, in an amount of 4 parts by weight in Comparative Example 18 and in an amount of 5 parts by weight in Comparative Example 19. Also, the formed products of the comparative examples were subject to the same tests in Example 27. The results were as shown in Table 5.

TABLE 5

| | Surfactant | *1 | *3 | Stability *4 | *2 |
|---|---|---|---|---|---|
| Example | | | | | |
| 27 | polyoxyethylene (20) sorbitan monooleate | 3 | 0 | 0 | 0 |
| 28 | polyoxyethylene (20) sorbitan monooleate | 4 | 0 | 0 | 0 |
| 29 | polyoxyethylene (20) sorbitan monooleate | 5 | 0 | 0 | 0 |
| Comparative Example | | | | | |
| 17 | sodium polyoxyethylene (3) lauryl ether sulfate | 3 | 0 | 0 | X |
| 18 | sodium polyoxyethylene (3) lauryl ether sulfate | 4 | 0 | 0 | X |
| 19 | sodium polyoxyethylene (3) lauryl ether sulfate | 5 | 0 | 0 | X |

*1: Amount of surfactant used
*2: Film forming property during straight dip forming step
*3: Prevulcanization step
*4: Centrifuging step As will be apparent from Table 5, Example 27 to 29 wherein the nonionic surfactant was used as a component of the deproteinizing agent each permitted the latex to exhibit increased stability in both prevulcanization step and centrifuging step, to thereby ensure smooth workability. Also, the examples each improved film forming property in the straight dip forming step to a degree to permit a formed product of a uniform thickness to be rapidly provided.

On the contrary, although each of Comparative Examples 17 to 19 contributed to an improvement in stability of the latex, it caused excessive sagging of the latex during the straight dip forming step, required an increased period of time for film forming property and rendered a thickness of the product non-uniform, resulting in the product being defective.

As can be seen from the foregoing, the method of the present invention can be applied to the conventional natural rubber product producing apparatus without modifying it and used for production of a foam product such as a foam rubber product or the like and a dipped product such as a glove, a condom, a catheter or the like.

Obviously many modifications and variations of the present invention are possible in light of the above teachings. It is therefore to be understood that within the scope of the appended claims the invention may be practiced otherwise than as specifically described.

What is claimed is:

1. A method for producing a formed product of deproteinized natural rubber latex comprising:
    a protein decomposition step of adding protease and a surfactant to natural rubber latex to decompose protein contained in the natural rubber latex;
    a prevulcanization step of subjecting the natural rubber latex to prevulcanization;
    a forming step of subjecting the natural rubber latex to forming, said forming step comprising the step of heating the prevulcanized natural rubber to thereby vulcanized the natural rubber latex; and
    a cleaning removal step of removing a non-rubber content from the natural rubber latex using cleaning liquid.

2. A method as defined in claim 1, further comprising a postvulcanization step of subjecting the natural rubber to postvulcanization after said cleaning removal step.

3. A method as defined in claim 1, further comprising a mechanical removal step of mechanically removing an impurity from the natural rubber latex; said mechanical removal step being incorporated between said protein decomposition step and said prevulcanization step.

4. A method as defined in claim 1, further comprising a mechanical removal step of mechanically removing an impurity from the natural rubber latex; said mechanical removal step being incorporated between said prevulcanization step and said forming step.

5. A method as defined in claim 1, wherein in said protein decomposition step, the surfactant is used in an amount of 0.1 to 10 parts by weight based on 100 parts by weight of a solid content of the natural rubber latex.

6. A method as defined in claim 1, wherein said cleaning removal step is carried out twice or more;
    and further comprising a stripping step carried out between executions of said cleaning removal step.

7. A method as defined in claim 1, wherein the cleaning liquid used in said cleaning removal step is at least one selected from the group consisting of an aqueous alkali solution, ammonia, water containing free chlorine in an amount of 0.005 to 0.02% by weight, and alcohol-water mixed liquid in which alcohol is present in an amount of 5 to 80% by weight.

8. A method as defined in claim 7, wherein alcohol contained in said alcohol-water mixed liquid is at least one selected from the group consisting of aliphatic alcohol having 1 to 5 carbon atoms and aliphatic alcohol having 1 to 5 carbon atoms which is replaced with an alkoxy group having 1 to 2 carbon atoms.

9. A method as defined in claim 7, wherein said alcohol is selected from the group consisting of methanol, ethanol, isopropyl alcohol and 3-methyl-3-methoxybutanol.

10. A method as defined in claim 7, wherein said alcohol-water mixed solution contains free chlorine in an amount of 0.005 to 0.02% by weight.

11. A method for deproteinizing natural rubber latex, comprising the step of:
    adding protease and a nonionic surfactant to the natural rubber latex to thereby decompose protein contained in the natural rubber latex, said nonionic surfactant having an LD 50 of 5000 mg/kg or more.

12. A method as defined in claim 11, wherein said nonionic surfactant is selected from the group consisting of an ester of polyhydric alcohol, a polyoxyalkylene ester and an ether of polyhydric alcohol.

13. A method of forming a product of deproteinized natural rubber latex, said method comprising the steps of
    (a) contacting natural rubber latex with protease and surfactant to decompose protein contained in the natural rubber latex;
    (b) prevulcanizing said natural rubber latex;
    (c) forming said natural rubber latex into a shape, said step of forming said natural rubber latex comprising the step of heating said natural rubber latex to thereby vulcanize said natural rubber latex; and (d) contacting the vulcanized natural rubber with a cleaning liquid.

14. The method of claim 13, said method further comprising an additional step (e) of postvulcanizing said natural rubber.

15. The method of claim 13, said method further comprising an additional step of mechanically removing an impurity from said natural rubber latex, said additional step occurring between said step (a) and said step (b).

16. A method as defined in claim 11, wherein said nonionic surfactant is an ester of polyhydric alcohol.

17. A method as defined in claim 11, wherein said nonionic surfactant is a polyoxyalkylene ester.

18. A method as defined in claim 11, wherein said nonionic surfactant is an ether of polyhydric alcohol.

19. A method as defined in claim 11, further comprising the step of:
subjecting the natural rubber latex with the added protease and nonionic surfactant to an enzyme reaction.

20. A deproteinizing agent for natural rubber latex consisting of protease and a nonionic surfactant, said nonionic surfactant having an LD 50 of 5000 mg/kg or more.

21. A deproteinizing agent as defined in claim 20, wherein said nonionic surfactant is selected from the group consisting of an ester of polyhydric alcohol, a polyoxyalkylene ester and an ether of polyhydric alcohol.

* * * * *